United States Patent Office.

GEORGE E. SELLERS, OF SELLERS LANDING, ILLINOIS.

*Letters Patent No. 61,864, dated January 22, 1867.*

IMPROVED METHOD OF UTILIZING WASTE EXTRACTS OF FIBROUS PLANTS.

*The Schedule referred to in these Letters Patent and making part of the same.*

TO ALL WHOM IT MAY CONCERN:

Be it known that I, GEORGE ESCOL SELLERS, of Sellers Landing, in the county of Hardin, and State of Illinois, have invented certain improvements in Utilizing Waste Soluble Extracts of Fibrous Plants in their preparation for paper stock.

The object of my invention is to utilize certain soluble vegetable extracts that have heretofore been wasted in the preparation of vegetable fibre for paper stock, and to fit them for use in the arts.

In a Patent granted me November 10, 1863, No. 40,576, I described a mode of disintegrating vegetable substances by a process of steaming or steam washing, combined with mechanical operations. By that process, the steam, after having done its work, was either used for heating water or it was allowed to escape. I now condense this steam and mix it with the drainage of the material under treatment when discharged from the boiler or digester, also with the juices expressed by the crushing-rollers. I then slowly evaporate to the consistence I require the extract. In the Patent granted me dated February 9, 1864, No. 41,538, I describe a mode of disintegrating and separating vegetable substances, so as to fit their fibrous and non-fibrous portions for use in the arts, by a process of heating by boiling under pressure to soften the material, and then separating the fibrous and non-fibrous portions by mechanical pressure and washing. When I use this boiling or macerating process, I add to the water in which the material has been boiled the juices expressed in mechanically separating the fibres, and then evaporate to the consistence I require the extract. The soluble vegetable extracts set free and removed in the process of disintegrating and preparing fibrous plants for paper stock by steam, heat, and water, without the use of alkalies, have heretofore been wasted. I have utilized and applied them to many purposes in the arts. The extracts from various woods, straw, corn husks, the bagasse of sorghum, &c., when concentrated by evaporation, contain large amounts of coloring matter and are valuable as dyes. The plant that I have most used for its fibre for paper stock is the reed or cane, (*Arundinaria macrosperma*.) The liquid extract from this plant, when freed from the arundine or insoluble non-fibrous portion of the plant by filtration, and evaporated to about the consistence of molasses, is valuable to color and flavor liquors, also to use with grain in distillation for the alcohol it yields. It is also an excellent substitute for molasses in the manufacture of shoe blacking, as it contains sufficient vegetable acid to dispense with the use of sulphuric acid, and when used for this purpose it has no injurious effect upon the leather. The extract obtained by slowly evaporating the condensed steam that escapes from the boiler or digester, in using my process as described in Patent No. 40,576, by the addition of bichromate of potash and gum, produces an excellent black writing ink or dye. The steam, condensed as it comes from the digester, gives a beautiful jet black color to any woods that contain tannin by simple immersion. The extract as obtained by either of the processes for disintegrating vegetable fibre for paper stock, patented by me, (Nos. 40,576 and 41,538,) combined with the juices expressed in separating the fibre, with all the arundine that it contains left in it when evaporated down to dryness, or, as I prefer, to about the density of common molasses, is the most efficient agent that I am aware of for removing and preventing scale or sedimentary deposits in steam boilers. I am using it successfully with stationary boilers, with water strongly impregnated with lime, and also with water from shale or clay banks; and with equal success in steamboat boilers using the muddy waters of the western rivers. It acts chemically in freeing the boilers from scale or deposit that has become hardened, also, in keeping the lime or other substances that would form scale in such a state that they are blown off at the mud-valve without any tendency to adhere to the boiler. The arundine or insoluble organic matter also acts mechanically in keeping the sediment in motion or in suspension. It is so minute in its particles, and of so delicate a structure, that any of it passing from the boiler with the steam has no injurious effect upon the valves or steam cylinders; at the same time it is valuable in keeping the boilers tight. The manner I use the extract, if evaporated to a solid state, is, to dissolve it in water and pump it into the boiler, or, in the liquid state, mix it in the feed water. On western steamboats, at the time when the rivers are high and very muddy, I find that about one gallon of the extract, of the consistency of molasses, to each ordinary double-flue boiler per day keeps them in a good, clean condition, and makes a very large saving in the consumption of fuel. I am aware that various vegetable extracts and acids have been used for this purpose, but none of them have acted so efficiently as the extract obtained in the process of disintegration and preparation of paper stock from cane by water and heat without the use of alkalies. It has no injurious effect upon the metal of the boilers. The minute organic matter, insoluble in water, which is combined with the soluble extract, acts mechanically in keeping the sediment in suspension, and also prevents leakage and priming. It has no tendency to injure valves, or cylinders, or to clog up throttles or pipes, as wood, chips, or saw dust do. I am also aware that alkaline liquids, after having been used to soften and disintegrate wood, straw, corn husks, and other vegetable fibrous substances, for paper stock, have been used for manure, and also, after undergoing fermentation, have been used for distillation and to feed cattle; but I am not aware that any of the soluble or extractive principle of fibrous plants, when separated from the cellulin and the lignin or arundine by steaming or boiling with water without the use of alkali in their preparation for paper stock, has ever been used for the purposes specified. When it is considered that most of the fibre-producing plants, when taken full of sap or in a green state, produce from about thirty to thirty-six per cent. of an organic substance that in my Patents Nos. 40,576 and 41,538 I have called arundine or lignin, and which is insoluble in water, either cold or highly heated, and that the consequent waste in the water of the sap and such soluble extractive portions of the plant as are dissolved by the steam or heated water, separated by washing, or are expressed mechanically in separating the fibres, amount to, say from thirty-three to fifty per cent., varying according to the dryness of the plant, it must be evident to any one that the utilization of any portion of this waste must form an important element in the cost of preparing vegetable fibre for use. I am now saving more than thirty gallons of concentrated extract from every ton of cane.

Having thus described the object and nature of my invention, what I claim as new, and desire to secure by Letters Patent, are—

1. The vegetable extract of fibrous plants, when obtained in the process of preparing fibre for paper stock, in the manner and for the purposes substantially as described.

2. The utilization of the vegetable extract of cane (*Arundinaria macrosperma*) and other fibrous plants, when obtained from them in the process of preparing their fibre for paper stock without other chemical agencies than water and heat, as a new article of commerce.

GEO. ESCOL SELLERS.

Witnesses:
 PHILIP M. PRICE,
 WILLIAMS OGLE.